(12) United States Patent
Mouri et al.

(10) Patent No.: US 10,151,438 B2
(45) Date of Patent: Dec. 11, 2018

(54) LIGHTING DEVICE FOR VEHICLE (71) Applicants: TOYOTA JIDOSHA KABUSHIKI KAISHA, Toyota-shi, Aichi-ken (JP); KOITO MANUFACTURING CO., LTD., Tokyo (JP)

(72) Inventors: Fumihiko Mouri, Owariasahi (JP); Susumu Yamamoto, Shizuoka (JP); Satoshi Yamamura, Shizuoka (JP)

(73) Assignees: TOYOTA JIDOSHA KABUSHIKI KAISHA, Toyota (JP); KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 15/821,311

(22) Filed: Nov. 22, 2017

(65) Prior Publication Data

US 2018/0156410 A1 Jun. 7, 2018

(30) Foreign Application Priority Data

Dec. 2, 2016 (JP) .................. 2016-235003

(51) Int. Cl.
*F21S 41/675* (2018.01)
*F21S 41/32* (2018.01)
*F21Y 115/10* (2016.01)
*F21S 41/141* (2018.01)
*F21S 41/20* (2018.01)

(52) U.S. Cl.
CPC ............. *F21S 41/675* (2018.01); *F21S 41/32* (2018.01); *F21S 41/141* (2018.01); *F21S 41/285* (2018.01); *F21Y 2115/10* (2016.08)

(58) Field of Classification Search
CPC ........ F21S 41/675; F21S 41/32; F21S 41/141; F21S 41/285; F21Y 2115/10
See application file for complete search history.

(56) References Cited

U.S. PATENT DOCUMENTS

| 2013/0038736 | A1  | 2/2013 | Yamamura |
|---|---|---|---|
| 2014/0042325 | A1* | 2/2014 | Yamamura ........... B60Q 1/0023 250/347 |
| 2014/0043805 | A1* | 2/2014 | Yamamura ................ F21K 9/56 362/231 |

(Continued)

FOREIGN PATENT DOCUMENTS

| EP | 2 559 935 A1 | 2/2013 |
|---|---|---|
| JP | 2015-005428 A | 1/2015 |

(Continued)

*Primary Examiner* — Kristy A Haupt
(74) *Attorney, Agent, or Firm* — Oliff PLC (57) ABSTRACT

A lighting device for a vehicle includes a light source configured to perform light irradiation, a blade including a reflective surface configured to reflect light irradiated from the light source toward an area in front of the vehicle, the blade being configured to rotate around a rotation axis, a drive device configured to rotationally drive the blade around the rotation axis, a detector configured to detect a person in front of the vehicle, and a control device configured to, in a case where the person is detected by the detector, control the light source and the drive device such that the drive device rotationally drives the blade to a position where a region in a prescribed range is irradiated with light reflected from the reflective surface of the blade and the light source is turned on.

4 Claims, 8 Drawing Sheets

(56) References Cited

U.S. PATENT DOCUMENTS

2016/0096467 A1   4/2016   Murakami et al.

FOREIGN PATENT DOCUMENTS

| JP | 2015-026628 A | 2/2015 |
| JP | 2015-044586 A | 3/2015 |
| JP | 2015-053277 A | 3/2015 |
| JP | 2016-074235 A | 5/2016 |

* cited by examiner

LIGHTING DEVICE FOR VEHICLE

INCORPORATION BY REFERENCE

The disclosure of Japanese Patent Application No. 2016-235003 filed on Dec. 2, 2016 including the specification, drawings and abstract is incorporated herein by reference in its entirety.

BACKGROUND

1. Technical Field

The present disclosure relates to a lighting device for a vehicle that is mounted in the vehicle to perform light irradiation.

2. Description of Related Art

In a technique described in Japanese Unexamined Patent Application Publication No. 2015-053277 (JP 2015-053277 A), a scan type lighting device for a vehicle has been suggested. In detail, in the technique described in JP 2015-053277 A, a reflector that rotates in one direction around a rotation axis while reflecting light emitted from a light source is provided. In the reflector, a blade having a shape twisted such that an angle between an optical axis and a reflective surface changes in a circumferential direction around the rotation axis is provided around the rotation axis. Then, the timing at which the light source is turned on or off or change in light emission intensity is synchronized with the rotation of the reflector, whereby a light distribution pattern for a high beam with an arbitrary region where light is shielded is formed.

SUMMARY

On the other hand, for the purpose of attracting attention of a person including a pedestrian in front of a host vehicle and an occupant on a bicycle, in order to perform light irradiation toward an area in front of the vehicle, the use of the technique described in JP 2015-053277 A is considered. For example, control is performed such that the light source is turned on in synchronization with a region corresponding to a person while the blade of the scan type lighting device for a vehicle of JP 2015-053277 A rotates, whereby it is possible to irradiate the person with light, and to attract attention of the person with light.

However, since the light source is turned on at a timing corresponding to the region of the person while the blade rotates, the turn-on time of the light source is shortened, and thus, it is considered that irradiated light is darkened and the person irradiated with light hardly notices light. Furthermore, since the light source is turned on while the blade rotates, irradiated light is dispersed and a light distribution pattern is blurred, and accordingly, there is room for improvement.

The present disclosure provides a lighting device for a vehicle capable of performing irradiation with light easily noticeable by a person using a scan type lighting device for a vehicle.

An aspect of the present disclosure relates to a lighting device for a vehicle. The lighting device includes a light source, a blade, a drive device, a detector, and a control device. The light source is configured to perform light irradiation. The blade includes a reflective surface configured to reflect light irradiated from the light source toward an area in front of the vehicle. The blade is configured to rotate around a rotation axis. The reflective surface has a shape twisted such that an angle between the reflective surface and an optical axis of light from the light source changes in a circumferential direction of the blade around the rotation axis. The drive device is configured to rotationally drive the blade around the rotation axis. The detector is configured to detect a person in front of the vehicle. The control device is configured to, in a case where the person is detected by the detector, control the light source and the drive device such that the drive device rotationally drives the blade to a position where a region in a prescribed range from the person is irradiated with light reflected from the reflective surface of the blade and the light source is turned on.

According to the aspect of the present disclosure, the blade is irradiated with light from the light source, and light is reflected from the reflective surface of the blade toward an area in front of the vehicle.

The blade is configured to rotate around the rotation axis, the reflective surface has a shape twisted such that the angle between the reflective surface and the optical axis of light from the light source changes in the circumferential direction of the blade around the rotation axis, and the blade is rotationally driven by the drive device.

The detector detects the person. For example, the detector detects the person using a camera, a millimeter-wave radar, or the like.

The control device is configured to, in a case where the person is detected by the detector, control the light source and the drive device such that the drive device rotationally drives the blade to the position where the region in the prescribed range from the person is irradiated with light reflected from the reflective surface of the blade and the light source is turned on. That is, it is possible to irradiate the region in the prescribed range from the person with light using a scan type lighting device for a vehicle. Furthermore, since the blade rotates to the position where the region in the prescribed range from the detected person is irradiated with light and the light source is turned on, it is possible to perform light irradiation with a bright and sharp light distribution compared to a case where a light source is turned on at a timing corresponding to a region in a prescribed range while the blade rotates. Then, since it is possible to perform light irradiation with a bright and sharp light distribution, the person easily notices light.

In the lighting device according to the aspect of the present disclosure, the region in the prescribed range may be a region in a visual field range of the person at a prescribed distance from the person. According to the aspect of the present disclosure, an irradiated person easily notices light compared to a case where light irradiation toward a person is performed.

In the lighting device according to the aspect of the present disclosure, the region in the prescribed range may be a region near the center of a road in a vehicle width direction of the vehicle with respect to the person. According to the aspect of the present disclosure, it is possible to attract attention of a person to crossing of a road.

In the lighting device according to the present disclosure, the lighting device may further include a light source for a high beam, a blade for the high beam, and a drive device for the high beam. The light source for the high beam may be configured to perform light irradiation. The blade for the high beam may include a reflective surface for the high beam configured to reflect light irradiated from the light source for the high beam toward an area in front of the vehicle. The blade for the high beam may be configured to rotate around a second rotation axis. The reflective surface for the high beam may have a shape twisted such that an angle between the reflective surface for the high beam and an optical axis of light from the light source for the high beam changes in a circumferential direction of the blade for the high beam around the second rotation axis. The drive device for the high beam may be configured to rotationally drive the blade for the high beam around the second rotation axis. The detector may be configured to detect an oncoming vehicle. The control device may be configured to control the light source for the high beam and the drive device for the high beam such that the light source for the high beam is turned on while the drive device for the high beam rotates the blade for a high beam. The control device may be configured to, in a case where the oncoming vehicle is detected by the detector, control the light source for the high beam such that the light source for the high beam is turned off at a timing at which a region corresponding to the oncoming vehicle is irradiated with light from the light source for the high beam. According to the aspect of the present disclosure, it is possible to attract attention of a person while suppressing glare light to an oncoming vehicle due to a high beam.

As described above, according to the aspect of the present disclosure, it is possible to provide a lighting device for a vehicle capable of performing irradiation with light easily noticeable by a person using a scan type lighting device for a vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a diagram illustrating irradiation of light from a marking light irradiation unit of the lighting device for a vehicle according to the embodiment;

DETAILED DESCRIPTION OF EMBODIMENTS

Figure 1:
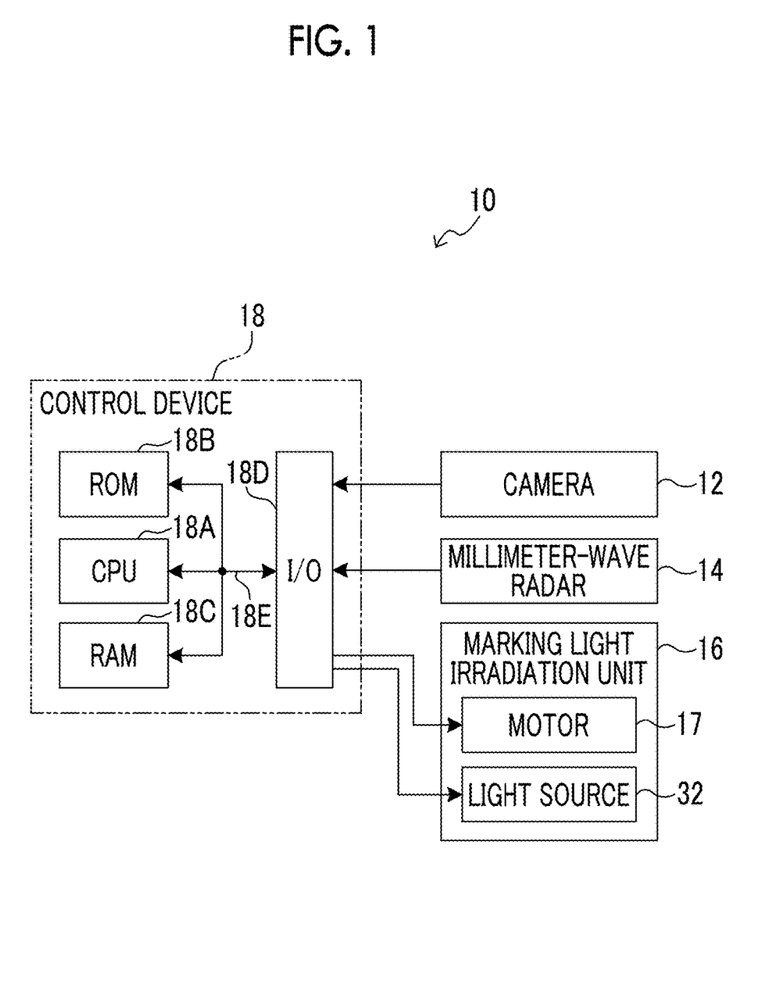
FIG. 1 is a block diagram showing the schematic configuration of a lighting device for a vehicle according to an embodiment.

Hereinafter, an example of an embodiment of the present disclosure will be described in detail referring to the drawings. FIG. 1 is a block diagram showing the schematic configuration of a lighting device for a vehicle according to the embodiment.

In a lighting device 10 for a vehicle according to the embodiment, as shown in FIG. 1, a marking light irradiation unit 16 is connected to a control device 18, and the marking light irradiation unit 16 is controlled by the control device 18.

The marking light irradiation unit 16 performs light irradiation in a road surface direction in order to attract attention of a person including a pedestrian and an occupant on a bicycle. In the embodiment, the marking light irradiation unit 16 irradiates a region in a prescribed range from a person in a traveling direction of the host vehicle with light, thereby attracting attention to the approach of the vehicle. The color and brightness of light irradiated from the marking light irradiation unit 16 may be light having the same color and brightness as a headlight, or irradiation with light having a color and brightness different from the headlight may be performed. In a case where light has the same color and brightness as the headlight, it is possible to attract attention of a person in a high beam region in a state where the headlight is a low beam or a region farther from a high beam in a high beam state.

The control device 18 is constituted of a microcomputer including a CPU 18A, a ROM 18B, a RAM 18C, and an I/O 18D. The marking light irradiation unit 16 is connected to the I/O 18D, and the control device 18 controls the turn-on and off and irradiation direction of the marking light irradiation unit 16. In detail, the marking light irradiation unit 16 includes a motor 17 as a drive device and a light source 32, and the control device 18 controls the drive of the motor 17 and the turn-on of the light source 32.

The ROM 18B of the control device 18 stores a table for controlling the marking light irradiation unit 16, a program for executing irradiation control, or the like. The RAM 18C is used as a work memory or the like for various arithmetic operations or the like in the CPU 18A.

A camera 12 that images in front of the vehicle and a millimeter-wave radar 14 are connected to the I/O 18D, and an imaging result of the camera 12 and a reception result of the millimeter-wave radar 14 are input to the control device 18. The camera 12 and the millimeter-wave radar 14 are an example of a detector, and the control device 18 is an example of a control device.

The control device 18 detects a person including a pedestrian or an occupant on a bicycle from the imaging result of the camera 12 through image processing, such as image pattern matching.

The control device 18 detects a relative distance or a relative speed of the host vehicle and an obstacle from the reception result of a millimeter wave transmitted from the millimeter-wave radar 14 and reflected from the obstacle including a person.

In a case where a person is detected, the control device 18 controls the marking light irradiation unit 16 such that the marking light irradiation unit 16 irradiates a region in a prescribed range from the person with light. In a case where a person is relatively moving with respect to the host vehicle, the control device 18 controls the marking light irradiation unit 16 such that the marking light irradiation unit 16 moves light to follow the movement of the person.

Specifically, in a case where a person is detected, as shown on an upper side of FIG. 2, the control device 18 controls the marking light irradiation unit 16 such that the marking light irradiation unit 16 irradiates a region in a visual field range of the person at a prescribed distance from the person as the region in the prescribed range from the person with light. In a case where a person is relatively moving, as shown on a lower side of FIG. 2, the control device 18 controls the marking light irradiation unit 16 such that the marking light irradiation unit 16 moves light while the distance between the person and light irradiated from the marking light irradiation unit 16 is maintained to the prescribed distance. As the prescribed distance, a distance at which a person easily visually recognizes light projected onto a road surface, and for example, a distance (variable distance) that is the same as the height of the person, a distance (fixed distance) of 1.5 m to 2 m, or the like can be applied. Since an angle of field of a person is about 70° in a downward direction, it is preferable that a distance or more corresponding to the angle of field of 70° is applied as the prescribed distance. Since light with which the road surface is irradiated is hardly recognized even when light is excessively far from the person, a distance at which a person in a range of several meters from the distance or more corresponding to the angle of field of 70° easily visually recognizes light is preferably applied.

For example, as shown in FIG. 2, in a case where a pedestrian is about to cross in front of the host vehicle, a region (a region on a vehicle center side in a vehicle width direction at a prescribed distance from the pedestrian) to be a visual field range in front of the pedestrian is irradiated with light, thereby attracting attention to the approach of the vehicle. Even in a case where the pedestrian is walking along a road, or the like, in order to suppress sudden crossing or the like, a region to be a visual field range in front of the pedestrian is irradiated with light to attract attention.

In the following description, light with which the region at the prescribed distance from the person is irradiated may be simply referred to as marking light. In the embodiment, an example where the region in the visual field range of the person at the prescribed distance from the person is applied as the region in the prescribed range from the person is described, an applicable embodiment of the present disclosure is not limited thereto, and for example, a region including the person may be applied.

The marking light irradiation unit 16 that is applied to the lighting device 10 for a vehicle according to the embodiment will be described. In the embodiment, scan type lighting that rotates a rotating mirror is used as a marking light irradiation unit.

Figure 3A:
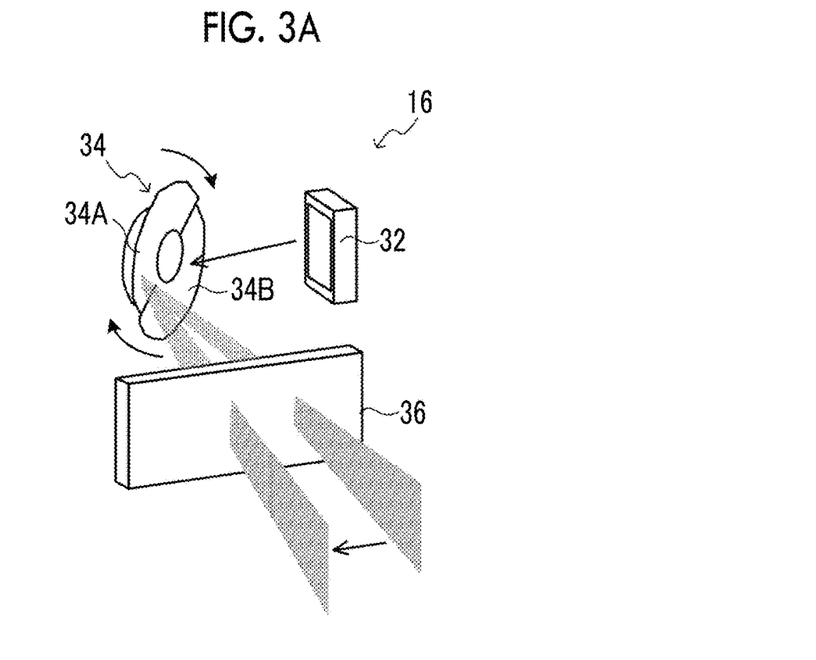
FIG. 3A is a diagram showing an example of a scan type marking light irradiation unit of the lighting device for a vehicle according to the embodiment.
Figure 3B:
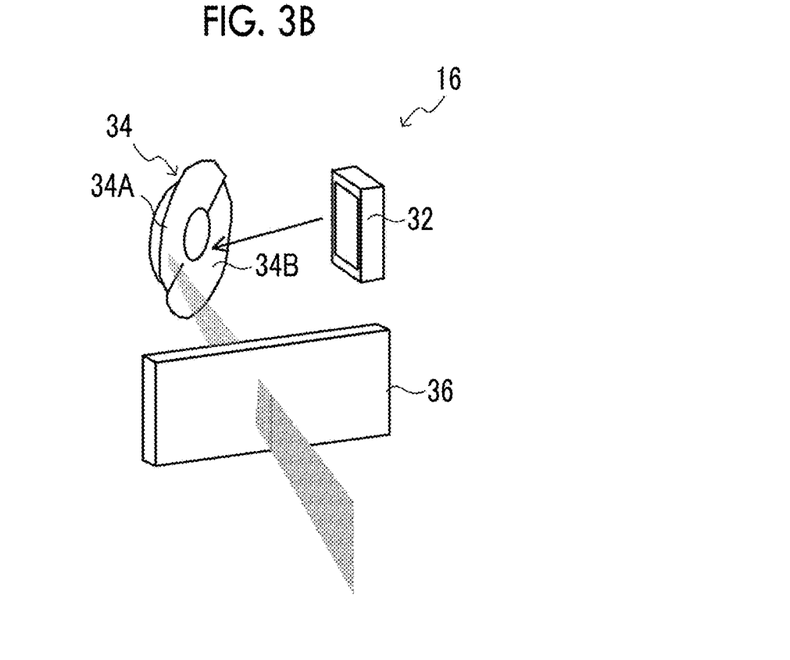
FIG. 3B is a diagram showing a manner in which the scan type marking light irradiation unit of the lighting device for a vehicle according to the embodiment stops rotation of a rotating mirror and irradiation with marking light is performed.
Figure 4:
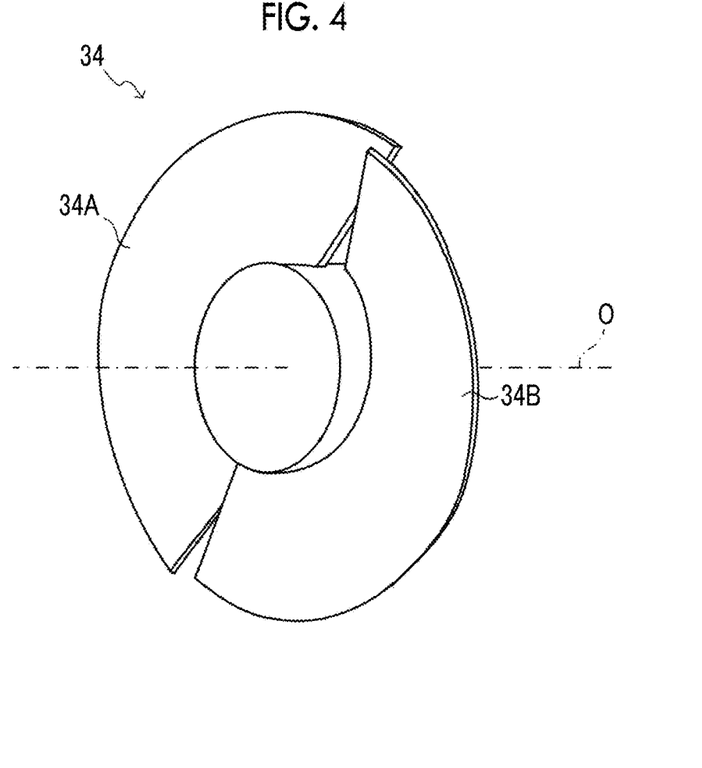
FIG. 4 is an enlarged view of the rotating mirror.

FIG. 3A is a diagram showing an example of the scan type marking light irradiation unit 16 of the lighting device 10 for a vehicle according to the embodiment, and FIG. 3B is a diagram showing a manner in which the scan type marking light irradiation unit 16 of the lighting device 10 for a vehicle according to the embodiment stops rotation of a rotating mirror 34 and irradiation with marking light is performed. FIG. 4 is an enlarged view of the rotating mirror 34.

As shown in FIG. 3A, the marking light irradiation unit 16 includes the light source 32, such as an LED, the rotating mirror 34, and a lens 36. The light source 32 outputs longitudinal light in an up-down direction of the vehicle. The light sources 32, such as LEDs, are arrayed in the up-down direction of the vehicle to output longitudinal light in the up-down direction of the vehicle. The rotating mirror 34 and the lens 36 are provided in a light irradiation direction of the light source 32, light irradiated from the light source 32 is reflected from the rotating mirror 34, and linear light is irradiated toward an area in front of the vehicle through the lens 36.

The rotating mirror 34 is configured to rotate around a rotation axis 0 (see FIG. 4) while reflecting light from the light source 32 toward an area in front of the vehicle. As shown in FIG. 4, the rotating mirror 34 has blades 34A, 34B that rotate around the rotation axis 0 and have a shape twisted such that an angle between a reflective surface reflecting light and an optical axis changes in a circumferential direction around the rotation axis 0. With this, a reflection direction of light of the rotating mirror 34 can be changed to the vehicle width direction with the rotation of the rotating mirror 34. In regard to the scan type marking light irradiation unit 16, for example, the technique described in Japanese Unexamined Patent Application Publication No. 2016-074235 (JP 2016-074235 A) is applied, and the light source 32 is turned on while the rotating mirror 34 rotates at high speed, whereby it is possible to perform irradiation with linear light toward an area in front of the vehicle. In a case where an oncoming vehicle is detected, control is performed such that the light source 32 is turned on while the rotating mirror 34 rotates, and the light source 32 is turned off at the timing at which a region corresponding to the oncoming vehicle is irradiated with light, whereby it is possible to suppress glare light to the oncoming vehicle.

In the embodiment, an example where the two blades 34A, 34B are provided has been described; however, the number of blades may be one or equal to or greater than three.

On the other hand, in the marking light irradiation unit 16 according to the embodiment, the turn-on of the light source 32 is controlled in synchronization with the rotation of the rotating mirror 34 without constantly turning on the light source 32, whereby it is possible to irradiate a desired position with light. For example, the light source 32 is turned on in synchronization with the position of the rotating mirror 34 that reflects light toward the region at the prescribed distance from the person, whereby it is possible to irradiate the region at the prescribed distance from the person with linear light. Specifically, a correspondence relationship between a rotation position of the rotating mirror 34 and an irradiation region is stored in advance in the ROM 18B or the like. Then, the control device 18 controls the turn-on timing of the light source 32 such that the light source 32 is turned on in synchronization with the position of the rotating mirror 34 corresponding to the irradiation region at the prescribed distance from the detected person, whereby it is possible to irradiate a road surface in the region at the prescribed distance from the person with linear light.

However, in a case where the light source 32 is turned on in synchronization with a position of the rotating mirror 34 corresponding to a target irradiation region while the rotating mirror 34 rotates, the turn-on time of the light source 32 is shortened, and light is dispersed, whereby the light intensity of marking light is low to cause a blurred light distribution.

Figure 5:
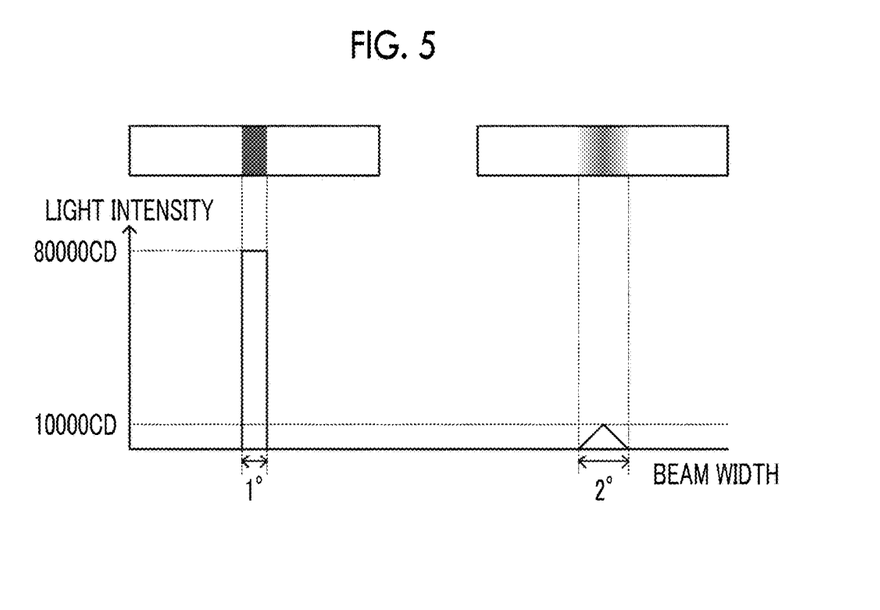
FIG. 5 is a diagram showing a difference in light intensity in a case where a rotating mirror of scan type lighting is stopped and irradiation with marking light is performed and a case where a corresponding position is irradiated with marking light while the rotating mirror rotates.

Accordingly, in the embodiment, the light source 32 is turned on while the rotating mirror 34 rotates to the position corresponding to the target irradiation region, and the marking light irradiation unit 16 is controlled such that the marking light irradiation unit 16 irradiates the target irradiation region with light. In the embodiment, instead of controlling the turn-on timing of the light source 32 while the rotating mirror 34 rotates, as shown in FIG. 3B, the rotating mirror 34 rotates to the position corresponding to the target irradiation region and the light source 32 is turned on in a state in which the rotating mirror 34 is stopped. In a case where a person is relatively moving with respect to the host vehicle, the position of the rotating mirror 34 changes so as to follow the movement of the person. With this, compared to controlling the turn-on timing of the light source 32 such that the target irradiation region is irradiated with light while the rotating mirror 34 rotates, it is possible to perform irradiation with marking light at high light intensity. For example, as shown in FIG. 5, in a case where the turn-on control of the light source 32 is performed while the rotating mirror 34 rotates, light is dispersed and has light intensity of 10000 [cd]. In a case where the rotating mirror 34 rotates to the position corresponding to the target irradiation region and the light source 32 is turned on in a state in which the rotation of the rotating mirror 34 is stopped, light is not dispersed and has light intensity of 80000 [cd], and a bright and sharp light distribution is possible.

Figure 6:
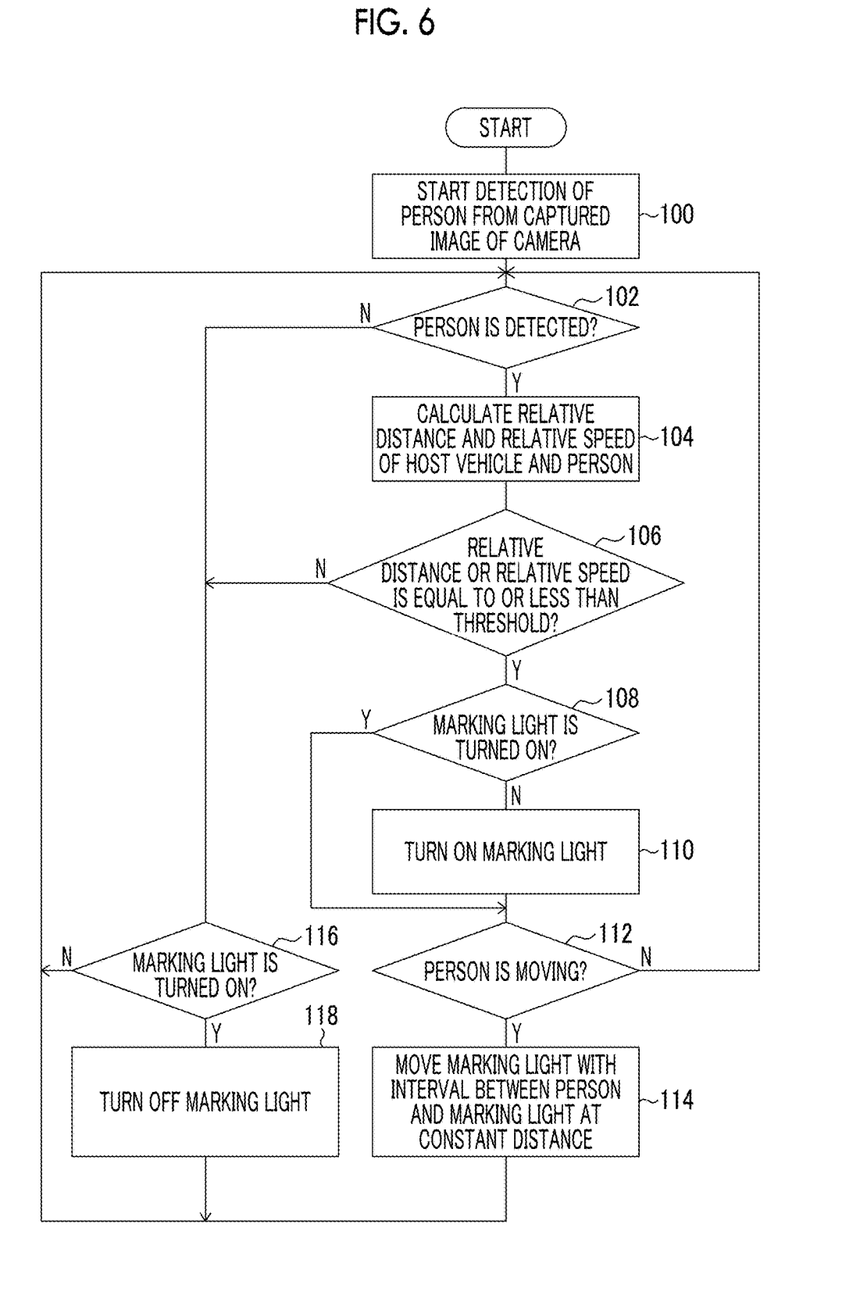
FIG. 6 is a flowchart showing an example of a flow of specific processing that is performed by a control device of the lighting device for a vehicle according to the embodiment.

Subsequently, specific processing that is performed by the control device 18 of the lighting device 10 for a vehicle according to the embodiment configured as above will be described. FIG. 6 is a flowchart showing an example of a flow of specific processing that is performed by the control device 18 of the lighting device 10 for a vehicle according to the embodiment. The processing of FIG. 6 starts in a case where an ignition switch (not shown) is turned on.

In Step 100, the CPU 18A acquires a captured image of the camera 12 and starts detection of a person from the captured image. That is, detection of a person is started from the captured image using various image processing techniques, such as pattern matching.

In Step 102, the CPU 18A determines whether or not a person is detected. In a case where the determination is affirmative, the process progresses to Step 104, and in a case where the determination is negative, the process progresses to Step 116 described below.

In Step 104, the CPU 18A calculates a relative distance and a relative speed of the host vehicle and the person and progresses to Step 106. In the embodiment, the CPU 18A calculates the relative distance and the relative speed of the detected person and the host vehicle based on a reception signal of the millimeter-wave radar 14.

In Step 106, the CPU 18A calculates the relative distance or the relative speed and determines whether or not the calculated value is equal to or less than a prescribed threshold. In the determination, a value representing a possibility of collision is calculated based on the relative distance or the relative speed, thereby determining whether or not a possibility of collision is high. In a case where the determination is affirmative, the process progresses to Step 108, and in a case where the determination is negative, the process progresses to Step 116. A determination method of the possibility of collision is not limited thereto, and determination may be made using a value other than the value of the relative distance or the relative speed. In the embodiment, in a case where there is a possibility of collision, marking light is turned on; however, Steps 104 and 106 may be omitted, and marking light may be turned on in a case where a person is detected, regardless of the possibility of collision.

In Step 108, the CPU 18A determines whether or not marking light is turned on by the marking light irradiation unit 16 with processing described below already performed. In a case where the determination is negative, the process progresses to Step 110, and in a case where the determination is affirmative, the process progresses to Step 112.

In Step 110, the CPU 18A controls the marking light irradiation unit 16 such that the marking light irradiation unit 16 turns on the marking light, and progresses to Step 112. That is, the rotating mirror 34 rotates to a position corresponding to the detected target irradiation region, and the light source 32 is turned on in a state in which the rotating mirror 34 is fixed, whereby the target irradiation region is irradiated with marking light. In the embodiment, as the target irradiation region that is irradiated with marking light, the region at the prescribed distance from the detected person is irradiated with light. Light is irradiated in a visual field range of a person, whereby the irradiated person easily notices light, and it is possible to effectively attract attention. In a case of turning on marking light, a region at a prescribed distance in front of a person may be irradiated with light, or a region at a prescribed distance on a road center side in the vehicle width direction from the person may be irradiated with light. Marking light is irradiated in front of a person, whereby the irradiated person easily notices marking light. Marking light is turned on in the region at the prescribed distance on the road center side in the vehicle width direction from the person, whereby it is possible to attract attention to crossing of a road. In a case where a situation in front of the person is determinable, marking light is irradiated in front of the person, and in a case where it is difficult to determine a direction in which a person is moving or a situation in front of the person, in order to attract attention to crossing of a road, marking light may be turned on the road center side in the vehicle width direction of the person.

In Step 112, the CPU 18A determines whether or not the detected person is moving. In regard to the determination, movement in the vehicle width direction can be determined from the captured image of the camera 12, and movement in a direction along the traveling direction of the host vehicle can be determined by calculating an absolute moving speed of the person from a vehicle speed of the host vehicle and the relative speed of the host vehicle and the person. In a case where the determination is affirmative, the process progresses to Step 114, and in a case where the determination is negative, the process returns to Step 102 and the above-described processing is repeated.

In Step 114, the CPU 18A controls the marking light irradiation unit 16 such that the marking light irradiation unit 16 moves marking light while maintaining the distance between the person and the marking light to a constant distance (prescribed distance), and returns to Step 102 to repeat the above-described processing. That is, the marking light irradiation unit 16 is controlled such that the marking light irradiation unit 16 follows the movement of the person. With this, it is possible to attract attention to the approach of the vehicle with marking light even when the person moves.

In Step 116, the CPU 18A determines whether or not marking light is turned on by the marking light irradiation unit 16 with the above-described processing already performed. In a case where the determination is affirmative, the process progresses to Step 118, and in a case where the determination is negative, the process returns to Step 102 and the above-described processing is repeated. In Step 118, the CPU 18A controls the marking light irradiation unit 16 such that the marking light irradiation unit 16 turns off marking light, and returns to Step 102 to repeat the above-described processing.

In this way, in the embodiment, in a case where a person is detected and there is a possibility of collision with the host vehicle, since the region at the prescribed distance from the person to be the visual field range of the detected person is irradiated with light, the person can easily notice light compared to light irradiation toward the person. Since light is easily noticed, it is possible to effectively attract attention to the approach of the vehicle.

Since light irradiation is performed while maintaining the prescribed distance to follow the movement of the person, the person who is moving easily notices light, and it is possible to effectively attract attention of the person who is moving.

In the embodiment, since the rotating mirror 34 rotates to the position corresponding to the target irradiation region and the light source 32 is turned on in a state in which the rotating mirror 34 is stopped, it is possible to make marking light bright compared to a case where the turn-on control of the light source 32 is performed while the rotating mirror 34 rotates. As shown in FIG. 5, it is possible to make the light distribution of marking light sharp without causing blurring. That is, since a bright and sharp light distribution can be achieved compared to performing the turn-on control of the light source 32 while the rotating mirror 34 rotates, a pedestrian more easily notices marking light.

In the embodiment, in a case where irradiation with marking light is not performed, it is possible to use the marking light irradiation unit 16 as lighting for a high beam. In this case, control is performed such that the light source 32 is turned on while the rotating mirror 34 rotates, and in a case where an oncoming vehicle is detected, the light source 32 is turned off at the timing at which the region corresponding to the oncoming vehicle is irradiated, whereby it is possible to suppress glare light to the oncoming vehicle.

Figure 7:
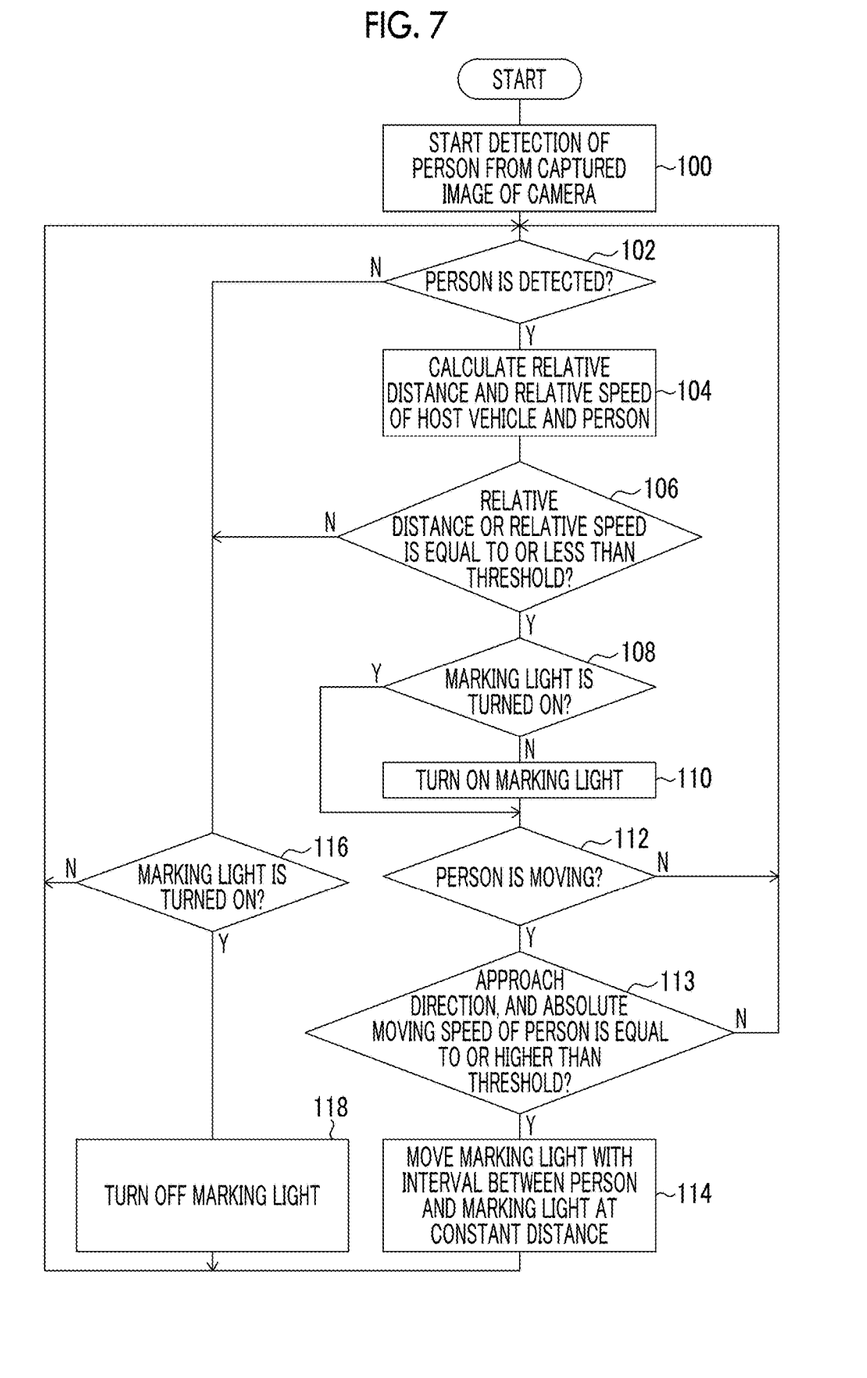
FIG. 7 is a flowchart showing a modification example of a flow of specific processing that is performed by the control device of the lighting device for a vehicle according to the embodiment.

In the processing of FIG. 6, in a case where a person is detected, marking light is turned on, marking light is moved along with the movement of the person, and even in a case where the person is far from the host vehicle, marking light is moved to follow the person; however, an applicable embodiment of the present disclosure is not limited thereto. For example, in a case where a person is moving in a direction far from the host vehicle in the vehicle width direction, marking light may not be moved. For example, as shown in FIG. 7, Step 113 is added between Step 112 and Step 114. FIG. 7 is a flowchart showing a modification example of a flow of specific processing that is performed by the control device 18 of the lighting device 10 for a vehicle according to the embodiment. In the example, in Step 113, the CPU 18A determines a direction in which the person approaches the host vehicle in the vehicle width direction and whether or not the absolute moving speed of the person is equal to or greater than a threshold (may include zero), and in a case where the determination is affirmative, the process progresses to Step 114 to move marking light. In a case where the determination is negative, the process returns to Step 102 and the above-described processing is repeated without moving marking light. With this, it is possible to reduce a processing load without moving marking light unnecessarily. Furthermore, since insignificant light irradiation is not performed toward a person to be irradiated, troublesomeness is eliminated.

Figure 8:
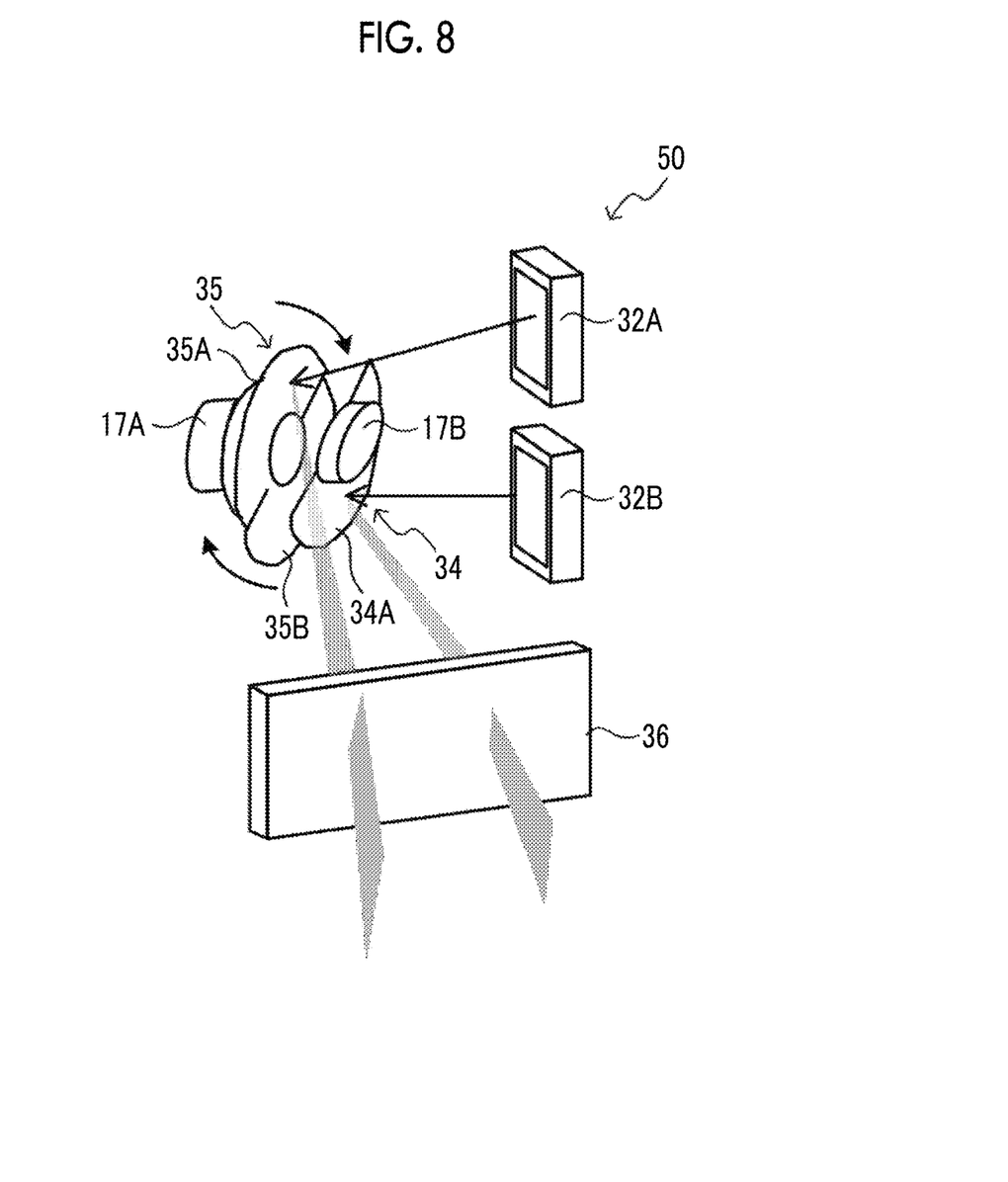
FIG. 8 is a diagram showing a marking light irradiation unit of a modification example.
Figure 9:
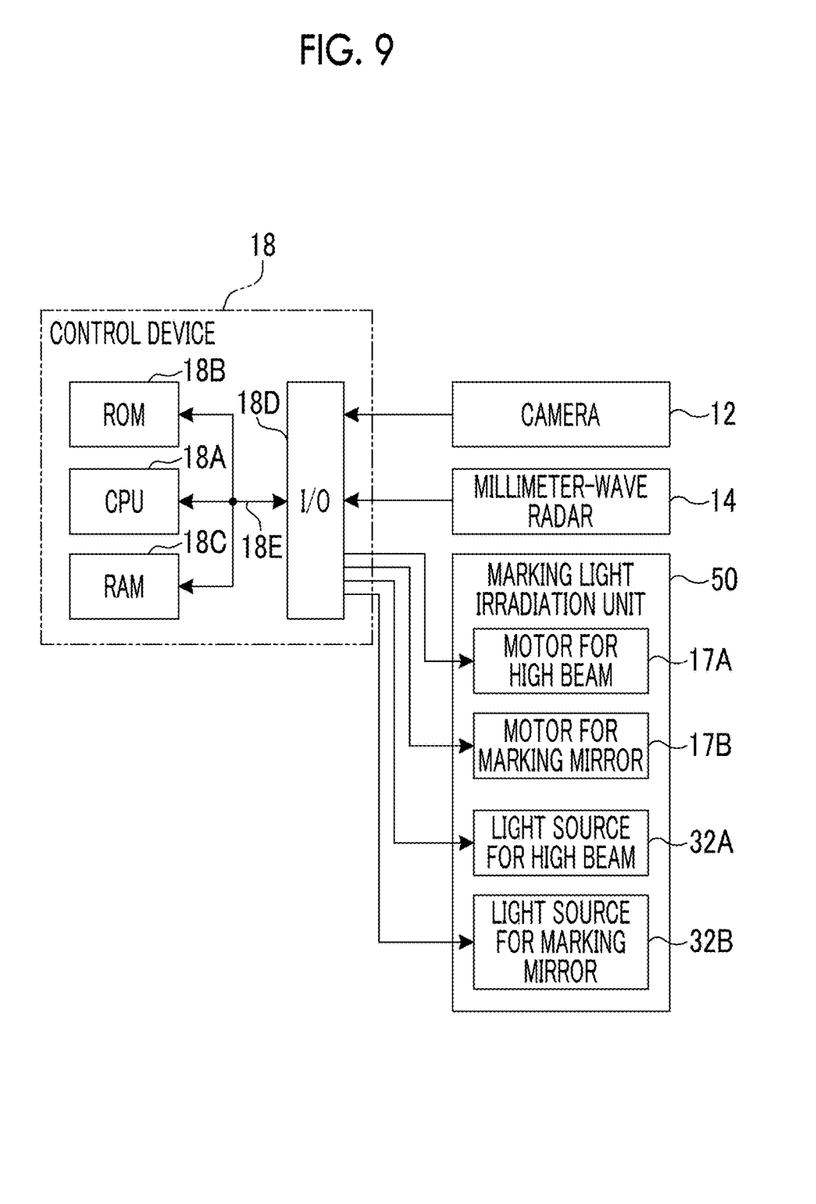
FIG. 9 is a block diagram showing the schematic configuration of a lighting device for a vehicle in which the marking light irradiation unit of the modification example is provided.

Subsequently, a modification example of the marking light irradiation unit 16 will be described. FIG. 8 is a diagram showing a marking light irradiation unit 50 of the modification example. FIG. 9 is a block diagram showing the schematic configuration of a lighting device for a vehicle in a case where the marking light irradiation unit 50 of the modification example is provided.

The marking light irradiation unit 50 of the modification example includes a rotating mirror 35 for a high beam, a rotating mirror 34 for marking light, a light source 32A for a high beam, and a light source 32B for marking light. The rotating mirror 35 for a high beam, the rotating mirror 34 for marking light, the light source 32A for a high beam, and the light source 32B for marking light are connected to the I/O 18D of the control device 18.

The rotating mirror 35 for a high beam includes two blades 35A, 35B. The rotating mirror 34 for marking light includes one blade 34A in the embodiment.

The rotating mirror 35 for a high beam and the rotating mirror 34 for marking light include drive sources on the same axis. The rotating mirror 35 for a high beam is driven by a motor 17A for a high beam, and the rotating mirror 34 for marking light is driven by a motor 17B for marking light.

The light source 32A for a high beam performs light irradiation toward an area in front of the vehicle through the rotating mirror 35 for a high beam. The light source 32B for marking light performs light irradiation toward an area in front of the vehicle through the rotating mirror 34 for marking light.

With such a configuration, the rotating mirror 35 for a high beam and the light source 32A for a high beam can be used for high beam irradiation, and the rotating mirror 34 for marking light and the light source 32B for marking light can be used for marking light irradiation. That is, the control device 18 performs control such that the light source 32A for a high beam is turned on while the rotating mirror 35 for a high beam rotates, and in a case where an oncoming vehicle is detected, the light source 32A for a high beam is turned off at the position of the rotating mirror 35 for a high beam corresponding to the oncoming vehicle, whereby it is possible to suppress glare light to the oncoming vehicle. As in the embodiment, in a case where a person is detected, the control device 18 controls the motor 17B for marking light and the light source 32B for marking light such that the motor 17B for marking light rotates the rotating mirror 34 for marking light to a position where light is reflected toward the region at the prescribed distance from the person, and the light source 32B for marking light is turned on in a state in which the rotating mirror 34 for marking light is stopped. With this, as in the embodiment, it is possible to perform irradiation with marking light with a bright and sharp light distribution.

In the embodiment, one of control for preventing glare light to the oncoming vehicle during a high beam and control for turning on marking light is performed while the other control cannot be performed; however, in the modification example, it is possible to perform both kinds of control simultaneously. In other words, in the modification example, it is possible to attract attention of the person while suppressing glare light to the oncoming vehicle due to a high beam.

In the embodiment, an example where the relative distance or the relative speed of the host vehicle and an obstacle, such as a person, is detected by the camera 12 and the millimeter-wave radar 14 has been described; however, an applicable embodiment of the present disclosure is not limited thereto. For example, the relative distance or the relative speed of the host vehicle and the obstacle can be detected using a stereo camera without using the millimeter-wave radar.

The processing shown in FIGS. 6 and 7 that is performed by the control device 18 of the lighting device 10 for a vehicle in the embodiment has been described as software processing that is performed by executing a program, but may be processing that is performed by hardware. Alternatively, the processing may be processing that is performed by a combination of both of software and hardware. The program that is stored in the ROM may be distributed in the form of being stored in various storage mediums.

An applicable embodiment of the present disclosure is not limited to the above, and in addition to the above, can be of course modified and embodied in various ways without departing from the gist of the present disclosure.

What is claimed is:

1. A lighting device for a vehicle, the lighting device comprising:
    a light source configured to perform light irradiation;
    a blade including a reflective surface configured to reflect light irradiated from the light source toward an area in front of the vehicle, the blade being configured to rotate around a rotation axis, and the reflective surface having a shape twisted such that an angle between the reflective surface and an optical axis of the light irradiated from the light source changes in a circumferential direction of the blade around the rotation axis;
    a drive device configured to rotationally drive the blade around the rotation axis;
    a detector configured to detect a person in front of the vehicle; and
    a control device configured to, in a case where the person is detected by the detector, control the light source and the drive device such that (1) the drive device rotationally drives the blade to a position where light reflected from the reflective surface of the blade will be directed to a region at a prescribed distance spaced away from the person, (2) the drive device stops rotation of the blade with the blade at the position, and (3) after the rotation of the blade is stopped at the position, the light source is turned on.

2. The lighting device according to claim 1, wherein the region at the prescribed distance spaced away from the person is a region in a visual field range of the person at the prescribed distance spaced away from the person.

3. The lighting device according to claim 1, wherein the region at the prescribed distance spaced away from the person is a region near a center of a road in a vehicle width direction of the vehicle with respect to the person.

4. The lighting device according to claim 1, further comprising:
    a high beam light source for a high beam configured to perform high beam light irradiation;
    a second blade for the high beam including a second reflective surface for the high beam configured to reflect high beam light irradiated from the high beam light source toward an area in front of the vehicle, the second blade being configured to rotate around a second rotation axis, and the second reflective surface having a shape twisted such that an angle between the second reflective surface and an optical axis of the high beam light irradiated from the high beam light source changes in a circumferential direction of the second blade around the second rotation axis; and
    a high beam drive device for the high beam configured to rotationally drive the second blade around the second rotation axis, wherein:
    the detector is configured to detect an oncoming vehicle;
    the control device is configured to control the high beam light source and the high beam drive device such that the high beam light source is turned on while the high beam drive device rotates the second blade; and
    the control device is configured to, in a case where the oncoming vehicle is detected by the detector, control the high beam light source such that the high beam light source is turned off at a timing at which a region corresponding to the oncoming vehicle is irradiated with the high beam light irradiated from the high beam light source.

* * * * *